(12) United States Patent  
Berr

(10) Patent No.: US 8,275,534 B2  
(45) Date of Patent: Sep. 25, 2012

(54) METHOD AND COMPUTER PROGRAM FOR OPERATING AN INTERNAL COMBUSTION ENGINE, AND CONTROL UNIT

(75) Inventor: Tobias Maria Berr, Stuttgart (DE)

(73) Assignee: Dr. Ing. H. C. F. Porsche Aktiengesellschaft, Stuttgart (DE)

( * ) Notice: Subject to any disclaimer, the term of this patent is extended or adjusted under 35 U.S.C. 154(b) by 333 days.

(21) Appl. No.: 12/641,767

(22) Filed: Dec. 18, 2009

(65) Prior Publication Data

US 2010/0222983 A1   Sep. 2, 2010

(30) Foreign Application Priority Data

Feb. 27, 2009  (DE) .......................... 10 2009 010 925

(51) Int. Cl.
*F02D 43/00* (2006.01)

(52) U.S. Cl. ..................... 701/102; 123/179.3

(58) Field of Classification Search ............... 701/29, 701/35, 102, 112, 113, 114; 123/179.3, 179.4
See application file for complete search history.

(56) References Cited

U.S. PATENT DOCUMENTS

| | | | | |
|---|---|---|---|---|
| 4,873,950 A * | 10/1989 | Furuyama | ............... | 123/179.3 |
| 5,653,659 A | 8/1997 | Kunibe et al. | | |
| 5,977,646 A * | 11/1999 | Lenz et al. | .................. | 123/179.4 |
| 6,371,889 B1 | 4/2002 | Kuroda et al. | | |
| 6,532,926 B1 | 3/2003 | Kuroda et al. | | |
| 6,763,903 B2 * | 7/2004 | Morimoto et al. | ............... | 701/22 |
| 6,817,329 B2 * | 11/2004 | Buglione et al. | ........... | 123/179.4 |
| 7,844,391 B2 * | 11/2010 | Dietz | ............................ | 701/113 |
| 2002/0013655 A1 * | 1/2002 | Amano et al. | ................ | 701/112 |
| 2002/0074173 A1 * | 6/2002 | Morimoto et al. | ........... | 180/65.2 |
| 2003/0176964 A1 * | 9/2003 | Turner et al. | ................... | 701/113 |
| 2004/0216719 A1 | 11/2004 | Condemine et al. | | |
| 2005/0216177 A1 * | 9/2005 | Kassner | ........................ | 701/112 |
| 2006/0208568 A1 | 9/2006 | Kaita et al. | | |
| 2009/0292453 A1 * | 11/2009 | Dietz | ............................ | 701/112 |

FOREIGN PATENT DOCUMENTS

| | | |
|---|---|---|
| DE | 100 40 094 A1 | 4/2001 |
| DE | 10 2006 000 114 A1 | 12/2006 |
| DE | 10 2007 009 836 A1 | 9/2008 |
| GB | 2427441 A | 12/2006 |
| JP | 58028575 A | 2/1983 |
| JP | 2006-256562 A | 9/2006 |
| JP | 2008019716 A | 1/2008 |
| WO | WO 2008/104330 A1 * | 9/2008 |

OTHER PUBLICATIONS

German Patent and Trademark Office Search Report, dated Sep. 3, 2009.

* cited by examiner

*Primary Examiner* — Stephen K Cronin
*Assistant Examiner* — Arnold Castro
(74) *Attorney, Agent, or Firm* — Leydig, Voit & Mayer, Ltd.

(57) ABSTRACT

A method makes it possible to measure and evaluate the efficiency of a start-stop system of a vehicle having an internal combustion engine, and on the basis of the measurement, to optimize the efficiency in a vehicle-specific fashion or with regard to the driving behavior of the driver.

11 Claims, 3 Drawing Sheets

METHOD AND COMPUTER PROGRAM FOR OPERATING AN INTERNAL COMBUSTION ENGINE, AND CONTROL UNIT

CROSS-REFERENCE TO RELATED APPLICATION

This application claims the priority, under 35 U.S.C. §119, of German application DE 10 2009 010 925.0, filed Feb. 27, 2009; the prior application is herewith incorporated by reference in its entirety.

BACKGROUND OF THE INVENTION

Field of the Invention

The invention relates to a start-stop system of a motor vehicle with an internal combustion engine. Such start-stop systems are described, for example, in U.S. Patent Publication No. US 2006/0208568 A1 (cf. DE 10 2006 000 114 A1, JP2006256562) and U.S. Pat. No. 6,371,889 B1 (cf. DE 100 40 094 A1, JP2001055940).

There, whenever the vehicle is at a standstill, that is to say the speed of the vehicle is equal to zero, the system checks on the basis of various deactivation conditions as to whether it is possible to shut down the internal combustion engine while at a standstill. If one or more deactivation conditions are met, the internal combustion engine is shut down and is only re-activated when the controller detects the presence of at least one activation condition.

SUMMARY OF THE INVENTION

It is accordingly an object of the invention to provide a start-stop system which overcomes various disadvantages associated with the heretofore-known devices and methods of this general type and which provides for a start-stop system that is specifically improved as it further extends the advantages of the start-stop system with regard to fuel consumption and emissions.

With the foregoing and other objects in view there is provided, in accordance with the invention, a method of operating an internal combustion engine of a motor vehicle, the method which comprises:

automatically starting the internal combustion engine in dependence on at least one activation condition and/or automatically deactivating the internal combustion engine in dependence on at least one deactivation condition;

measuring the at least one activation condition and/or the at least one deactivation condition while the motor vehicle is at a standstill; and storing a presence of the activation conditions and/or deactivation conditions in a memory and evaluating the presence of the activation conditions and/or deactivation conditions in order to diagnose a control of the internal combustion engine.

In other words, the objects are achieved according to the invention, with a method for operating an internal combustion engine of a motor vehicle, in which method the internal combustion engine is automatically started as a function of at least one activation condition and/or automatically deactivated as a function of at least one deactivation condition, with the at least one activation condition and/or the at least one deactivation condition being measured while the vehicle is at a standstill, in that the presence of the activation conditions and/or deactivation conditions are stored and evaluated in order to diagnose the control of the internal combustion engine.

By means of the storage, according to the invention, of the deactivation and activation conditions and associated parameters and/or time indications, it is possible to measure the efficiency of the start-stop system at the end of a driving cycle and/or over the entire operating duration of the vehicle.

It is thus possible, for example, for a characteristic regarding the use of the start-stop system to be displayed to the driver at the end of a driving cycle, and for recommendations to be shown as to how he can improve the efficiency of the system.

It is also possible, in the event of an inspection of the motor vehicle, and during the course of an on-board diagnosis, for the characteristics determined using the method according to the invention to be read out and evaluated by trained professionals. This may on the one hand lead to the identification and realization of improvement potential in technical components of the motor vehicle. Furthermore, it is also possible for the trained workshop personnel to give the driver of the motor vehicle indications as to how he can use the start-stop system more efficiently and thereby reduce fuel consumption and save on operating costs. Finally, the vehicle manufacturer gains information regarding how often the start-stop system has been used, and if appropriate, regarding why said start-stop system could not be used despite the vehicle being at a standstill.

In a further advantageous embodiment of the invention, it is provided that a first time counter starts running when the vehicle comes to a standstill, and in that the first time counter is stopped when the vehicle starts moving again. In this way, it is possible to measure the standstill times of the vehicle, which are an important dependent variable for the assessment of the efficiency of the start-stop system.

In a further advantageous embodiment of the invention, it is provided that a first group of conditions for the stop of the internal combustion engine is queried and that a first counter is incremented by a value if all the conditions of the first group are met.

In a further advantageous embodiment of the invention, a second group of conditions for the deactivation of the internal combustion engine is queried and a second counter is incremented by a value if all the conditions of the second group of conditions are met. The deactivation of the internal combustion engine is thereupon initiated.

From the ratio of the values between the first counter, which measures the presence of the first group of conditions, and the value of the second counter, which measures the presence of the additional conditions of the second group of conditions, it is already possible to draw a first conclusion regarding the efficiency of the start-stop system.

In a further advantageous embodiment of the invention, it is provided that a second time counter starts running when the internal combustion engine is deactivated, and that the second time counter is stopped when the internal combustion engine is re-activated.

From the ratio of the first time counter, which measures the duration for which the vehicle is at a standstill, and of the second time counter, which measures the duration for which the internal combustion engine is deactivated, it is possible to draw a further, very significant conclusion regarding the efficiency of the start-stop system.

In a further advantageous embodiment of the invention, the deactivation of the internal combustion engine is prohibited if the value of the first time counter is higher than a predefined limit value. In this way, it is ensured that erroneous deactivations of the internal combustion engine cannot occur.

Furthermore, it is provided according to the invention that the cause for the prohibition of the stop of the internal combustion engine is stored together with a time indication.

To re-activate the internal combustion engine after a deactivation has taken place, the internal combustion engine is automatically activated if at least one activation condition is present, and the cause for the presence of the at least one activation condition is stored together with a time indication.

By forming ratios between the first time counter and the second time counter and between the value of the first time counter and the value of the second counter, it is possible to draw important conclusions regarding the efficiency of the start-stop system. Said ratios also give an indication regarding the causes for a low efficiency of the start-stop system, and may also be used to improve efficiency.

It has proven to be particularly advantageous for the method to be carried out at the end of each driving cycle, that is to say when the vehicle is parked and the ignition key is removed. It is then possible, directly after the internal combustion engine is shut down, for an evaluation to be carried out and for an indication of a possible improvement potential to be given to the driver before he has left the vehicle.

In addition, it is also possible for the method according to the invention to be carried out over the entire operating duration of the vehicle, such that a declaration can be made, over the entire distance driven by the vehicle, regarding the efficiency of the start-stop system.

Other features which are considered as characteristic for the invention are set forth in the appended claims.

Although the invention is illustrated and described herein as embodied in a method and computer program for operating an internal combustion engine, and control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
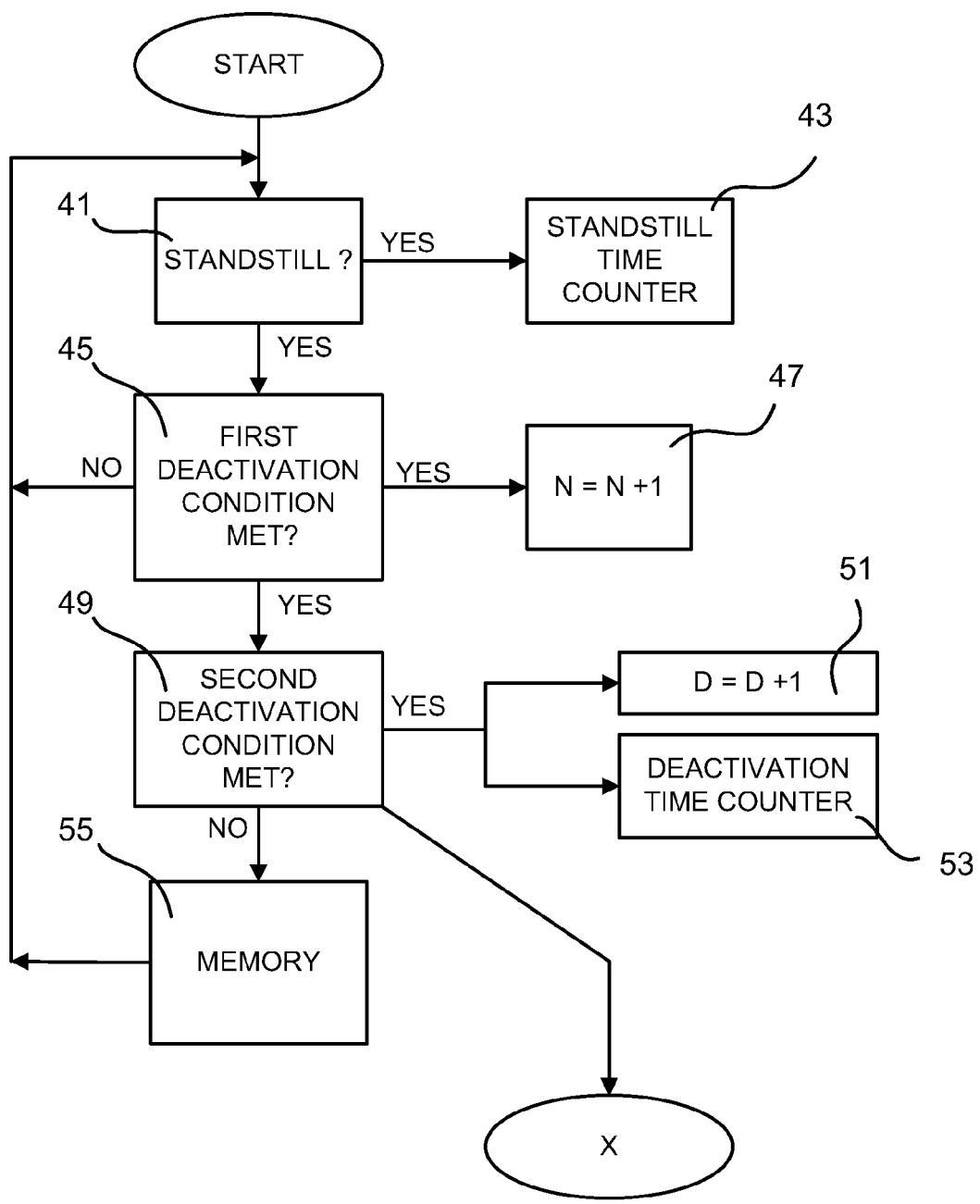
FIG. 1 is a first portion of a flow diagram illustrating an embodiment of the method according to the invention.

Referring now to the figures of the drawing in detail, we will first explain a functional principle of an internal combustion engine of a motor vehicle with a start-stop system on the basis of FIG. 3, to which reference is hereby made, and which will be explained further below.

An exemplary embodiment of the method according to the invention will be presented and explained with reference to FIGS. 1 and 2.

After the start of the method, a first functional block 41 checks whether the vehicle is in motion or at a standstill. If it is detected that the vehicle is at a standstill, a first time counter 43 starts running. The first time counter 43 therefore measures the duration for which the vehicle is at a standstill, during one driving cycle and over the entire operating duration of the internal combustion engine.

If it is detected in the first functional block 41 that the vehicle is at a standstill, then a second functional block 45 checks whether a first group of conditions for the deactivation of the internal combustion engine 40 are met.

Said conditions are base conditions which must imperatively be met in order to be able to deactivate the internal combustion engine 40. Examples of such base conditions are:

Driver brings the vehicle to a standstill by means of a braking process

Vehicle has been moving at speed for a defined time

Vehicle has moved a minimum distance

Enablement by means of selector lever pending

If the base conditions are not met, the program branches back to before the first functional block 41.

If the first group of conditions for the deactivation of the internal combustion engine are met, a first counter 47 is incremented by a value of 1. Furthermore, a third functional block 49 checks whether a second group of conditions for the deactivation of the internal combustion engine 40 are met. If the additional conditions for the deactivation of the internal combustion engine 40 are met, then the internal combustion engine 40 is deactivated and a second counter 51 is activated which measures the number of deactivations (D). In a second time counter 53, the duration of the deactivation of the internal combustion engine 40 is measured.

If the second group of conditions for the engine stop are not met, the cause, that is to say the condition which has not been met, is stored together with a time indication in a third memory 55.

Furthermore, the program then branches back to before the first functional block 41.

Figure 2:
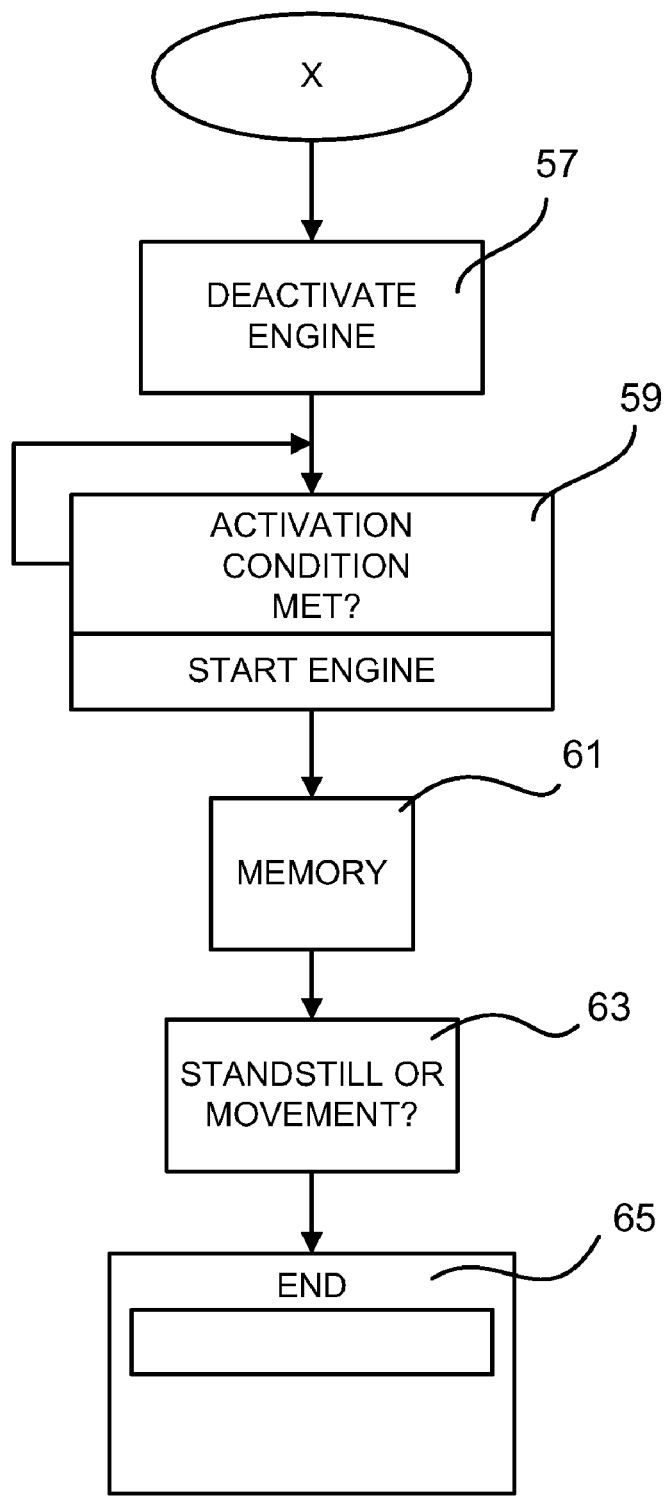
FIG. 2 is a second portion of a flow diagram illustrating the method according to the invention.

If the second group of conditions for the deactivation of the internal combustion engine are met, then the internal combustion engine is deactivated in a fourth functional block 57 (cf FIG. 2).

Enablement of stop operation by external control units

Enablement of stop operation by diagnosis conditions, engine control unit

Enablement of stop operation if relevant sensors and actuators are without faults Enablement of stop operation if relevant CAN communication is without faults.

A fifth functional block 59 checks whether at least one activation condition for the internal combustion engine is present. If this is the case, the internal combustion engine 40 is re-activated in the fifth functional block 59. In a second memory 61, the cause for the activation of the internal combustion engine is stored together with a time indication. At the same time, the second time counter 53, which measures the duration for which the internal combustion engine is deactivated, is stopped.

A sixth functional block 63 detects whether the vehicle still remains at a standstill or has in the meantime started moving. Once the vehicle is moving, the first time counter 43 is stopped. Finally, in a sixth functional block 65, the ratio between the values of the second counter 51 and the first counter 47 is formed for example at the end of each driving cycle for the directly preceding driving cycle or for the entire operating duration of the internal combustion engine.

Furthermore, it is possible to form a ratio from the values of the first time counter 43 (standstill time) and the second time counter 53 (deactivation time). From said ratios, it is possible to obtain the characteristic variables for evaluating the efficiency of the start-stop system. Said characteristic variables may on the one hand be taken into consideration for fault diagnosis of hardware components of the motor vehicle. This is advantageous in particular if the memories 55 and 61 are read out and the causes for the stop prevention or for the renewed deactivation of the internal combustion engine are taken into consideration in the evaluation.

Furthermore, from the efficiency of the start-stop system, it is also possible to provide the driver of the vehicle with recommendations on possible actions he can take to increase the efficiency and thereby reduce the fuel consumption of the vehicle.

Figure 3:
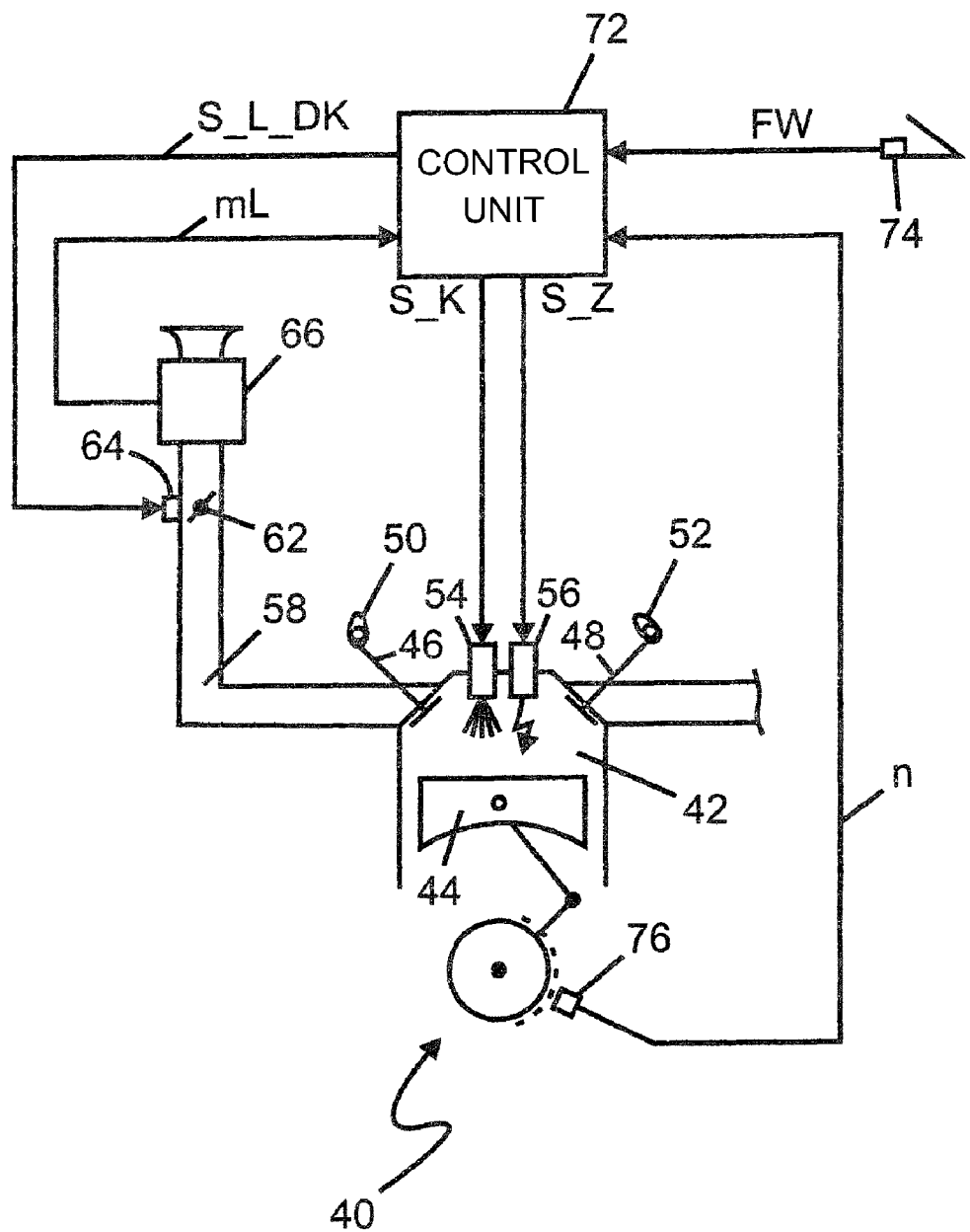
FIG. 3 is a schematic illustration of an internal combustion engine.

FIG. 3 shows the technical field of the invention. In detail, FIG. 3 shows the internal combustion engine 40 having the combustion chamber 42 which is sealed off in a movable fashion by a piston 44. A charge exchange of the combustion chamber 42 is controlled by at least one inlet valve 46 and one outlet valve 48 which, for this purpose, are actuated by corresponding actuators 50, 52. In the embodiment of FIG. 3, an injector 54 serves to meter fuel into an air charge of the combustion chamber 42. The resulting mixture of fuel and air is ignited by a spark plug 56. The charging of the combustion chamber 42 with air takes place from an intake pipe 58 which has a throttle flap 62, which is actuated by a throttle flap actuator 64, and an air mass sensor 66.

The internal combustion engine 40 is controlled by the control and regulating (i.e., closed-loop control) unit 72 which, for this purpose, processes signals depicting different operating parameters of the internal combustion engine 40. In the illustration of FIG. 3, such operating parameters are in particular signals mL from the air mass sensor 66, the signal FW from a driver demand transducer 74 which measures a torque demand by the driver, and the signal n from a rotational speed transducer 76 which measures a rotational speed n of a crankshaft of the internal combustion engine 40.

It is self-evident that modern internal combustion engines 40 are fitted with a multiplicity of further transducers and/or sensors, which are not illustrated here for clarity. Examples of such sensors are temperature sensors, pressure sensors, exhaust-gas sensors, et cetera. The listing of the transducers 66, 74 and 76 is therefore not intended to be exhaustive. It is also not necessary for a separate sensor to be provided for each of the operating parameters processed by the control and regulating device 72, because the control and regulating device 72 can model various operating parameters by means of mathematical models from other measured operating parameters.

From the received transducer signals, the control and regulating device 72 forms inter alia actuating variables for setting the torque to be generated by the internal combustion engine 40. In the embodiment of FIG. 3, such actuating variables are in particular an actuating variable S_K for activating the injector 54, an actuating variable S_Z for activating the spark plug 56, and an actuating variable S_L_DK for activating the throttle flap actuator.

The control and regulating device 72 is otherwise set up, in particular programmed, to carry out the method according to the invention or one of its embodiments, and/or to control the corresponding method processing.

The invention claimed is:

1. A method of operating an internal combustion engine of a motor vehicle, the method which comprises:
   automatically starting the internal combustion engine in dependence on at least one activation condition and/or automatically deactivating the internal combustion engine in dependence on at least one deactivation condition;
   measuring the at least one activation condition and/or the at least one deactivation condition while the motor vehicle is at a standstill; and
   storing a presence of the activation conditions and/or deactivation conditions in a memory and evaluating the presence of the activation conditions and/or deactivation conditions in order to diagnose a control of the internal combustion engine;
   starting a first time counter when the vehicle comes to a standstill, and stopping the first time counter when the vehicle starts moving; and
   prohibiting a deactivation of the internal combustion engine if a value of the first time counter is higher than a predefined threshold value.

2. The method according to claim 1, which comprises querying a first group of conditions for a deactivation stop of the internal combustion engine and incrementing a first counter by a value if all conditions of the first group of conditions are met.

3. The method according to claim 2, which comprises querying a second group of conditions for a deactivation of the internal combustion engine, incrementing a second counter by a value if all the conditions of the second group of conditions are met, and initiating a deactivation of the internal combustion engine.

4. The method according to claim 3, which comprises starting a second time counter when the internal combustion engine is deactivated, and stopping the second time counter when the internal combustion engine is re-activated.

5. The method according to claim 1, which comprises storing in the memory a cause for prohibiting the deactivation of the internal combustion engine together with a time indication.

6. The method according to claim 1, which comprises automatically activating the internal combustion engine if at least one activation condition is present, and storing a cause for the presence of the at least one activation condition in memory together with a time indication.

7. The method according to claim 4, which comprises forming a ratio from a value of the first time counter and a value of the second time counter.

8. The method according to claim 3, which comprises forming a ratio from a value of the first counter and a value of the second counter.

9. The method according to claim 1, which comprises carrying out the method for each driving cycle and/or over an entire operating duration of the vehicle.

10. The method according to claim 1, which comprises forming further conditions in dependence on one or more operating variables of the internal combustion engine and/or of a motor vehicle containing the internal combustion engine and/or of a system of the motor vehicle or of ambient conditions.

11. The method according to claim 10, which comprises selecting ambient conditions from the group consisting of a temperature, an air pressure, and a geodetic height.

* * * * *